United States Patent Office 3,578,630
Patented May 11, 1971

3,578,630
GLASS FILLED RANDOM COPOLYMERS OF AN OLEFIN AND AN UNSATURATED ACID
James K. Rieke and Frank H. Justin, Midland, Mich., assignors to The Dow Chemical Company, Midland, Mich.
No Drawing. Continuation-in-part of application Ser. No. 531,381, Mar. 3, 1966. This application Feb. 14, 1969, Ser. No. 799,486
Int. Cl. C08f 45/10
U.S. Cl. 260—41                                 8 Claims

ABSTRACT OF THE DISCLOSURE

Polymer compositions having improved tensile properties and improved impact resistance comprising a blend of between about 10 and about 40 weight percent glass fibers and between about 60 and about 90 weight percent of a random copolymer of an olefin such as ethylene and an ethylenically unsaturated carboxylic acid such as acrylic acid. The polymer compositions can be molded or extruded to produce useful articles of manufacture including gears, sprockets, washing machine agitators, gear housings, and the like.

---

This application is a continuation-in-part of copending application Ser. No. 531,381, filed Mar. 3, 1966, now abandoned.

This invention relates to glass filled polymers. In one aspect, this invention relates to polymer materials having improved physical properties. In another aspect, this invention relates to glass filled copolymers which can be molded or otherwise formed into useful articles of manufacture having superior physical properties.

It is well known in the art that the mechanical properties of polyolefin resins such as polystyrene and polyethylene acn be improved by the addition of glass fibers. In particular, the tensile strength of polyethylene is improved by the addition of glass fibers. The impact strength, however, of polyethylene having glass fibers as a filler is less than the impact strength of the polyethylene alone. Polyethylene having glass fibers as a filler are therefore especially suited for the production of molded articles which require good tensile strength but where impact strength is not an important consideration. Since many articles of manufacture require good impact strength as well as good tensile strength, it is desirable to have available a resin which satisfies both of these requirements.

The amount of glass fibers necessary as a filler in a polyolefin resin to achieve a material increase in the mechanical properties of the polyolefin is often greater than 35 weight percent. This amount of glass fibers increases the cost of the resin significantly. Accordingly, efforts are continually being made to achieve the desired mechanical properties of a glass filled polyolefin with the use of less glass filler material.

According to this invention, these and other disadvantages of the glass filled polyolefins of the prior art are overcome by a composition of matter comprising a blend of glass fibers and a random copolymer of an olefin and an unsaturated acid. The blends of this invention have improved mechanical properties in terms of high yield tensile strength, high impact resistance, and fair retention of yield tensile strength after exposure to water. In general, the excellent mechanical properties of the blends of this invention are achieved with less glass filler material than that required to achieve a significant increase in the mechanical properties of polyethylene or the like. This aspect makes the blends of this invention more attractive from an economic standpoint because the cost of the glass filler material in a particular blend is less.

Accordingly, it is an object of this invention to provide a composition of matter having improved physical and mechanical properties.

Another object of this invention is to provide a composition of matter having improved yield tensile strength, improved impact resistance, and good retention of yield tensile strength after exposure to water.

A furher object of this invention is to provde a composition of matter having improved physical and mechanical properties at a cost substantially less than the cost of similar compositions.

These and other objects of the invention will become apparent to one skilled in the art after studying the following detailed description and the appended claims.

The compositions of this invention which have improved mechanical and physical properties comprise a blend of between about 10 and about 40 weight percent glass fibers and between about 60 and about 90 weight percent random copolymer of ethylene and an ethylenically unsaturated carboxylic acid which can be copolymerized with the ethylene. A specific composition of matter within the scope of the compositions of this invention consists essentially of from about 40 to about 15 percent by weight glass fibers and from about 60 to about 85 percent by weight of a random copolymer of (a) ethylene and (b) an $\alpha,\beta$-monoethylenically unsaturated monocarboxylic acid which can be copolymerized with (a). The ethylene is generally present in the random copolymer in an amount equal to at least about 80 percent by weight of the copolymer. Preferably, the random copolymers used in preparing the composition of the invention contains between about 86 and about 97 weight percent olefin and between about 3 and about 14 weight percent ethylenically unsaturated acid.

The random copolymers which are blended with the glass fibers to produce the improved compositions of this invention can be obtained commercially or they can be prepared by any one of several processes well known in the art. For example, the copolymers may be obtained by the copolymerization of a mixture of the olefin and unsaturated acid. Methods employed for the preparation of such polymers have been described in the literature. In a preferred process, a mixture of the two monomers is introduced into a polymerization environment maintained at high pressures, 50 to 3,000 atmospheres, and elevated temperatures, 150° to 300° C., together with a free radical polymerization initiator such as a peroxide. An inert solvent for the system such as water or benzene, may be employed, or the polymerization may be substantially a bulk polymerization.

The copolymer can be mixed with the glass fibers in any physical form but it is preferred that the polymer be in powder form with a particle size of less than about 30 mesh, with the understanding that granules may also be utilized.

Glass fibers of any suitable size and shape can be employed in preparing the compositions of the invention. As a general proposition, the glass fibers have a diameter of between about 0.0001 and about 0.0008 inch and preferably between about 0.0003 and about 0.0004 inch. The length of the glass fibers should be less than about 1.5 inches and preferably less than 0.5 inch but still in the form of fibers.

Any of a wide variety of methods known in the art can be utilized for preparing blends of the glass fibers and the copolymer. Such methods include contacting the fiber with a hot melt of the copolymer or dry blending a chopped roving, staple fiber or filament in a dry blending apparatus together with an appropriate quantity of finely divided particulate copolymer.

An illustrative method which can be employed to prepare the compositions of this invention is described in copending application Ser. No. 532,819 of James L. Amos, Arnett L. Bird and Robert P. Snyder filed Jan. 7, 1966, the teachings of which are specifically incorporated herein by reference.

The ethylenically unsaturated carboxylic acids which are copolymerized with the olefin to produce the random copolymers useful in preparing the compositions of this invention are any suitable mono or polycarboxylic monoethylenically unsaturated acid and acid anhydrides having between 3 and 8 carbon atoms per molecule. It is generally preferred that the acid monomers be unsaturated in the $\alpha,\beta$ position on the molecule.

Exemplary ethylenically unsaturated carboxylic acids which can be copolymerized with the olefin include acrylic acid, methacrylic acid, crotonic acid, isocrotonic acid, maleic acid, maleic anhydride, and the like. Mixtures of two or more of the above-identified acids can be used if desired.

An injection pressure of about 9,000 pounds per square inch was used to prepare 6 x 1 inch test bars.

The yield tensile strength in pounds per square inch was determined for several test bars according to ASTM D 638-56T. The Izod impact strength in foot pounds at 73° F. was determined for several test bars according to ASTM D 256-56 (Method A) except unnotched test bars were used. The results of these tests are summarized in Table I below.

For purposes of control to illustrate the improved results obtained by the composition of this invention, blends of glass fibers and high density polyethylene in pellet and powder form having densities of 0.5 gm./cc. and melt indexes of 5.5 and 3.5 respectively were prepared in a manner similar to Example I and tested for yield tensile strengths and unnotched Izod impact. Comparative blends were also prepared from pellets of a low density polyethylene having a density of .92 gm./cc. and a melt index of 20 and glass fibers following the procedure of Example I and also tested for yield tensile strength and unnotched Izod impact. The properties of the comparative blends are recorded as controls in Table I below.

TABLE I

| Run No. | Polymer | Glass fibers in polymer (percent by weight) | Yield tensile strength (p.s.i.) | Unnotched Izod impact strength at 73° F. (ft.-lbs.) |
| --- | --- | --- | --- | --- |
| Control 1 | Random copolymer | 0 | (¹) | >10 |
| 1 | do | 20 | 5,630 | >10 |
| 2 | do | 30 | 6,442 | >10 |
| Control 2 | High density polyethylene (pellet) | 0 | 3,710 | >10 |
| Control 3 | do | 20 | 4,240 | 5.96 |
| Control 4 | do | 30 | 4,200 | 5.66 |
| Control 5 | High density polyethylene (powder) | 20 | 4,508 | 3.24 |
| Control 6 | do | 30 | 5,310 | 2.85 |
| Control 7 | Low density polyethylene (pellet) | 0 | (¹) | >10 |
| Control 8 | do | 20 | 2,020 | 3.88 |
| Control 9 | do | 30 | 2,474 | 3.03 |

¹ Exhibits no yield tensile strength. Ultimate tensile strength (point at which the test bars ruptured) averaged about 2,000 p.s.i.

The polymer compositions of this invention can be fabricated into a multitude of different articles having utility in a variety of fields where the mechanical and physical properties of the articles are important considerations. For example, the polymer compositions of this invention can be molded or extruded into a variety of useful articles including gears, sprockets, washing machine agitators, gear housings, terminal blocks in electrical systems, and the like.

The following examples illustrate the improved properties of the compositions of the invention. It is to be understood, however, that these examples are for the purpose of illustration only and the invention is not to be regarded as limited to any of the specific materials or conditions recited herein.

EXAMPLE I

A plurality of test bars were prepared by injection molding a series of blends of chopped glass fiber and an ethylene/acrylic acid random copolymer containing 8 percent by weight acrylic acid having a melt flow rate of 5 decig./min. (ASTM D-1238-62T, Condition E). The copolymer was in granular form and passed a 6 mesh U.S. Sieve size screen and was retained on a 10 mesh U.S. Sieve size screen. A glass roving comprising about 12,000 individual filaments having diameter ranging between 0.0003 and 0.0004 inch was chopped to obtain fiber lengths of about ¼-inch. The chopped glass roving and copolymer granules were fed in adjacent contact to an Ankerwerke Screw injection machine. The overall feed rate for the ethylene/acrylic acid copolymer ranged from about 7.5 to about 8.0 pounds per hour and the glass fibers were fed at an overall rate of about 2.0 to about 2.5 pounds per hour to provide blends containing 20 to 25 percent by weight glass. The overall cycle time for each operation was about 42 seconds. Screw speed was 129 r.p.m. and cylinder temperature was about 445° F.

From the data reported in Table I, it can be seen that the addition of glass fibers to the random copolymer to produce the compositions of this invention results in an increase in yield tensile strength of at least 2.8 times (Run No. 1) and at least 3.7 times (Run No. 2) over and above the yield tensile strength of the random copolymer alone (reported in Control 1 and based upon the average ultimate tensile strength of 2000 p.s.i. which is actually much greater than the yield tensile strength). The data in Table I also show that the improvement in yield tensile strength of the compositions of this invention (Run Nos. 1 and 2 as compared with Control 1) is unexpectedly greater than the improvement in yield tensile strength achieved by the addition of glass fibers to high density polyethylene (Controls 3 through 6 when compared with Control 2 and Controls 8 and 9 when compared with Control 7). That is, the greatest improvement in yield tensile strength obtained by adding glass fibers to polyethylene (Control 2 and Control 6) is an improvement of only 43 percent whereas the same amount of glass fibers in the random copolymer (Run No. 2 compared with Control 1) produces an improvement in yield tensile strength of at least 222 percent (based on the ultimate tensile strength of 2000 p.s.i. which is substantially higher than the actual yield tensile strength).

The improvement in impact strength with the compositions of this invention is perhaps even more significant and unexpected than the improvement in yield tensile strength. Referring to Table I it is noted that the unnotched Izod impact strength of the random copolymer is greater than 10 ft.-lbs. with the addition of up to 30 weight percent glass fibers. By comparing these results with the impact strength of polyethylene (Control 2 with Controls 3 through 6 and Control 7 with Controls 8 and 9), it is seen that the addition of glass fibers to polyethylene has exactly the opposite effect to that obtained when glass fibers are blended with the random copolymer in that the glass fibers are detrimental to the impact strength of polyethylene inasmuch as the impact strength decreases significantly with the addition of glass fibers.

EXAMPLE II

A random copolymer containing about 92 weight percent combined ethylene and about 8 weight percent combined acrylic acid in powder form was blended with glass fibers by tumbling the copolymer and the fibers in a cylindrical container rotated on two powered rolls. The glass fibers had an average diameter ranging between about 0.0003 and about 0.0004 inch and an average length of about 0.25 inch. The glass fibers were employed in varying amounts to produce several blends each containing 10, 20, and 30 weight percent glass. A portion of each of the resulting blends was charged to a compression molding apparatus and several test bars measuring about 1 inch by 6 inches were produced by subjecting each portion to a pressure of about 30 tons for 3 minutes at a temperature of about 360° F. Some of the test bars were tested for yield tensile strength according to test procedures outlined by ASTM D 638–56T. Other test bars were tested for notched Izod impact strength according to test procedure ASTM D 256–56 (Method A). The results of these tests are reported in Table II below.

TABLE II

|  | Yield tensile strength (p.s.i.) | | | | Notched Izod impact strength (ft.-lb./in. of notch) | | | |
| --- | --- | --- | --- | --- | --- | --- | --- | --- |
| Percent glass | 0 | 10 | 20 | 30 | 0 | 10 | 20 | 30 |
| Polyethylene | 3,900 | 5,100 | 6,800 | 8,400 | 2.6 | 2.1 | 1.3 | 1.2 |
| Random copolymer | [1] 2,100 | 3,300 | 5,100 | 6,700 | ([2]) | 9.8 | 7.2 | 8.2 |

[1] Based on ultimate yield strength.
[2] Polymer too ductile to measure impact strength.

While the glass fibers improves the yield tensile strength of polyethylene, the improvement is not as great as the improvement obtained with the random copolymer. With the addition of 30 weight percent glass, for example, the yield tensile strength of polyethylene is increased only 115 percent whereas the same amount of glass in the random copolymer results in an improvement in yield tensile strength of 219 percent.

The improvement in impact strength of the random copolymer with glass as compared to the impact strength of polyethylene with glass is even more significant than the improvement in tensile strength. As can be seen by the data in Table II, the glass fibers have a detrimental effect on the impact strength of polyethylene whereas the impact strength of the random copolymer with only 10 weight percent glass is not only much higher than the polyethylene with 10 weight percent glass but is also improved significantly over the random copolymer without glass fibers. Moreover, the impact strength of the random copolymer remains at a respectable and useful level with increased amounts of glass fibers whereas the impact strength of the polyethylene decreases materially. It is thus evident from the data in Table II that the compositions of this invention have very good tensile strength and impact strength properties whereas polyethylene with the same amounts of glass fibers has only a slight improvement in tensile properties over that of polyethylene without glass fibers.

EXAMPLE III

Several sets of test bars are fabricated by the technique described in Example I using random copolymers of ethylene and methacrylic acid, ethylene and crotonic acid, ethylene and isocrotonic acid and ethylene and maleic acid. Each of the compositions of these test bars contains about 92 weight percent ethylene and about 8 weight percent combined acid. The test bars have improved physical and mechanical properties thus indicating the advantages obtained by the compositions of this invention.

Although the invention has been described in considerable detail, it must be understood that such description is for the purpose of illustration only and should not be construed as limiting of the invention.

What is claimed is:
1. A composition of matter having improved tensile properties and impact resistance comprising a blend of between about 10 and about 40 weight percent glass fibers and between about 60 and about 90 weight percent random copolymer of ethylene and an ethylenically unsaturated carboxylic acid copolymerizable with said ethylene and having between 3 and 8 carbon atoms per molecule, said ethylene being present in said random copolymer in an amount equal to at least about 80 percent by weight of said random copolymer.

2. A composition of matter according to claim 1 wherein said ethylenically unsaturated carboxylic acid is selected from the group consisting of acrylic acid, methacrylic acid, crotonic acid, isocrotonic acid, and maleic acid.

3. A composition of matter according to claim 1 wherein said ethylenically unsaturated carboxylic acid is acrylic acid.

4. A composition of matter according to claim 1 wherein said ethylenically unsaturated carboxylic acid is methacrylic acid.

5. A composition of matter according to claim 1 wherein said ethylenically unsaturated carboxylic acid is crotonic acid.

6. A composition of matter according to claim 1 wherein said ethylenically unsaturated carboxylic acid is isocrotonic acid.

7. A composition of matter according to claim 1 wherein said ethylenically unsaturated carboxylic acid is maleic acid.

8. A composition of matter having improved tensile properties and impact resistance, said composition consisting essentially of from about 40 to about 15 percent by weight glass fibers and from about 60 to about 85 percent by weight of a random copolymer of (a) ethylene and (b) acrylic acid, said ethylene being present in said copolymer in an amount equal to at least about 80 percent by weight of said copolymer.

References Cited

UNITED STATES PATENTS

| 3,272,771 | 9/1966 | Busche et al. | 260—88.1 |
| 3,317,634 | 5/1967 | Longworth | 260—878 |
| 3,416,990 | 12/1968 | Robinson, Jr. | 260—878 |
| 3,013,915 | 12/1961 | Morgan | 260—41AG |
| 3,164,563 | 1/1965 | Maxwell et al. | 260—41AG |
| 3,375,219 | 3/1968 | Robb | 260—41 |
| 3,396,142 | 8/1968 | Little | 260—41 |

FOREIGN PATENTS 942,789  11/1963  Great Britain.

MORRIS LIEBMAN, Primary Examiner

S. L. FOX, Assistant Examiner